ated Mar. 16, 1915.

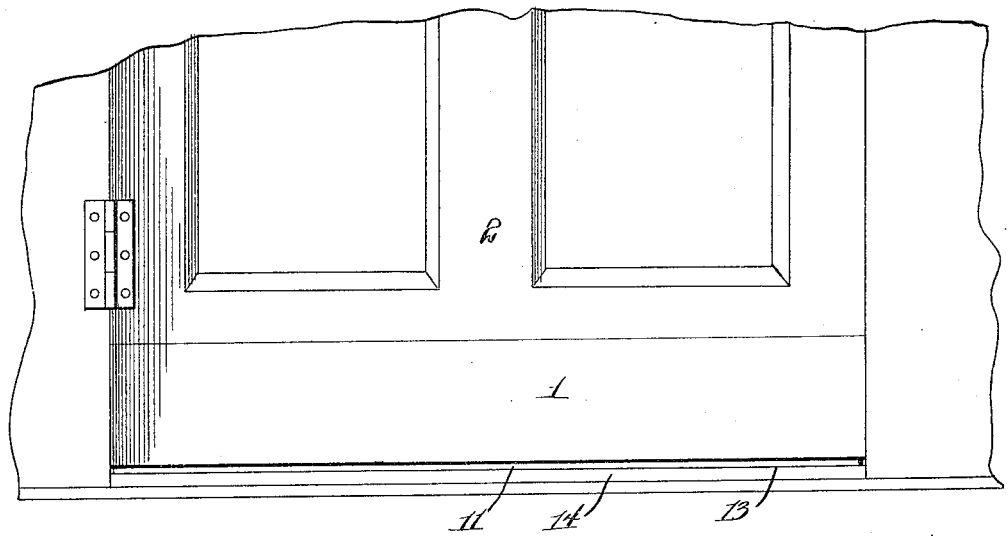
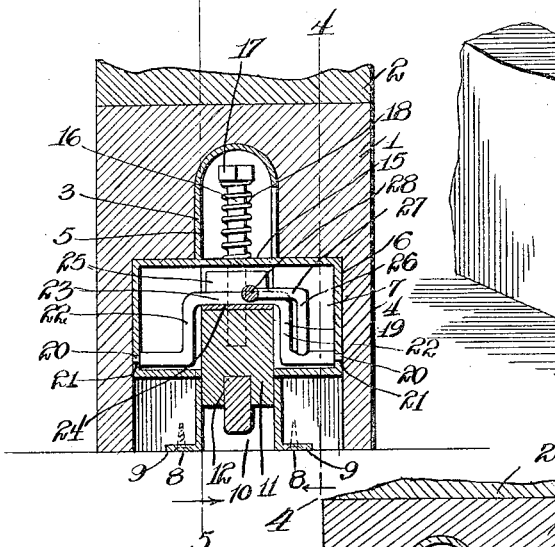
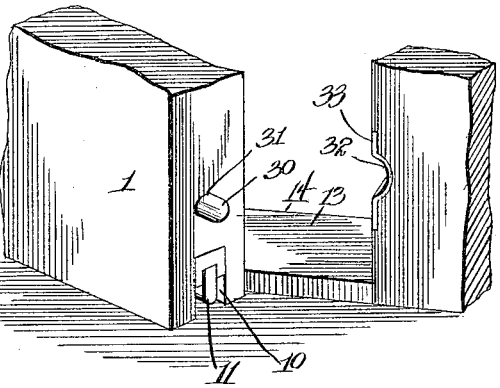

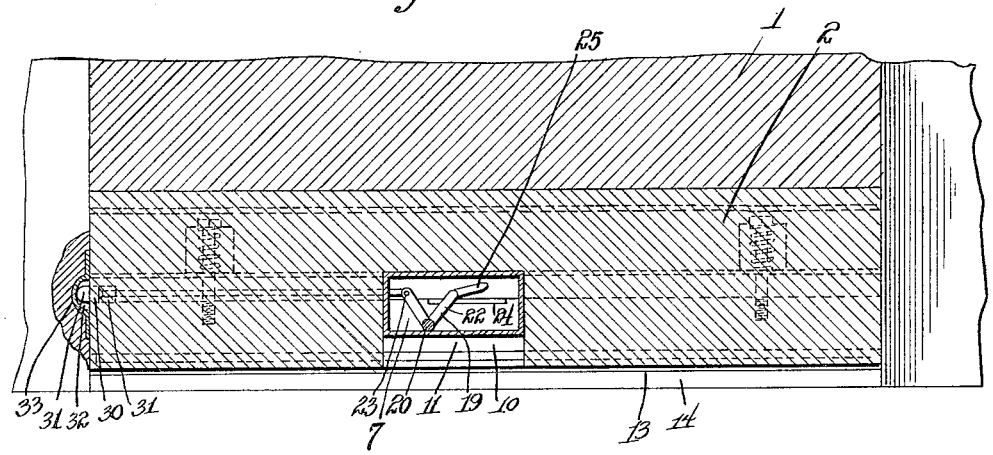
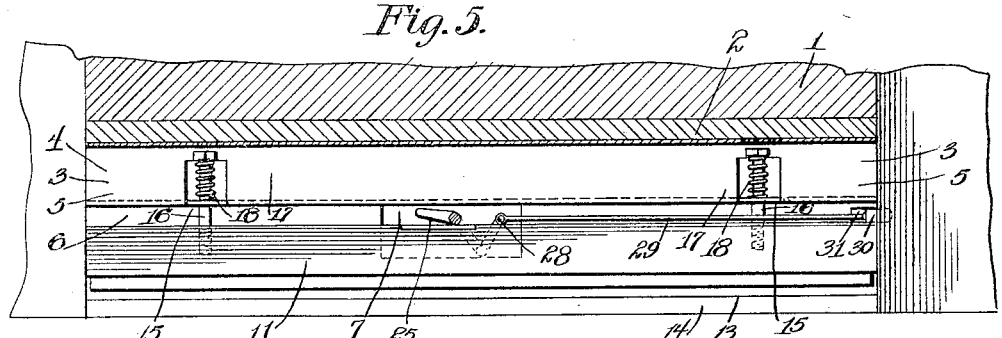
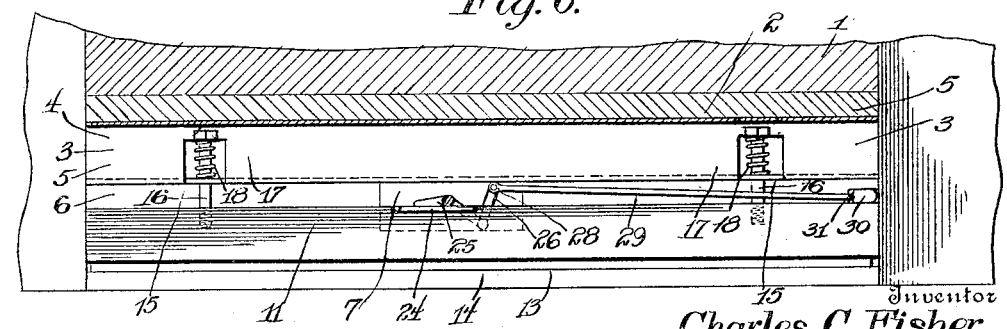

UNITED STATES PATENT OFFICE.

CHARLES C. FISHER, OF IRONTON, OHIO.

WEATHER-STRIP.

1,132,323.

Specification of Letters Patent.   Patented Mar. 16, 1915.

Application filed December 6, 1912.   Serial No. 735,225.

*To all whom it may concern:*

Be it known that I, CHARLES C. FISHER, a citizen of the United States, residing at Ironton, in the county of Lawrence and State of Ohio, have invented new and useful Improvements in Weather-Strips, of which the following is a specification.

My invention relates to a weather strip adapted to be used at the lower edge of a door in order to make an air-tight connection between the same and the door sill when the door is in closed position, the primary object thereof being to provide a device of this character having means operatively associated therewith for causing the weather strip to be thrown automatically into engaging position with respect to the door sill upon the door being brought into closed position, and means for bringing the weather strip into inoperative position when the door is opened.

A further object of the invention is to provide a weather strip of the class described and operating means therefor which is designed to insure even engagement between the weather strip and the door sill when the strip is in operative position.

A still further object is to provide a casing for the weather strip and its operating means which may be positioned within a slot in the bottom rail of the door so as to be in concealed position, and thus will not mar the appearance of the door.

The invention consists in the features of construction, combination and arrangement of parts, hereinafter fully described and claimed, reference being had to the accompanying drawing, in which:

Figure 1 is a fragmentary perspective view of a door having the preferred embodiment of my invention applied thereto, the door being shown in open position, the weather strip being in inoperative position; Fig. 2 is a front elevation showing the door in closed position and the weather strip in operative position; Fig. 3 is a transverse sectional view through the bottom rail of a door constructed in accordance with the invention and showing the weather strip casing in similar section and the weather strip inoperative; Fig. 4 is a longitudinal sectional view therethrough taken on the line 4—4 of Fig. 3. Fig. 5 is a similar sectional view taken on the line 5—5 of Fig. 3; Fig. 6 is a longitudinal sectional view similar to Fig. 5, showing the weather strip in operative position; and Fig. 7 is a transverse sectional view through the bottom rail of the door and not passing through the central weather strip casing.

Referring to the drawing, it will be seen that I have provided a bottom rail 1 of a door 2, with which the weather strip is to be used, with a longitudinal slot or recess 3 opening through its bottom face, and through the ends thereof also. Oppositely disposed lateral recesses 4 are provided in central communication with the slot 3. A metallic casing 5 is adapted to be secured within the slot 3 with its laterally extending portions 6, forming the compartment 7 disposed within the recess 4. This casing may be inserted in a position within the slotted bottom rail of the door by vertical movement, and is adapted to be secured in position by means of the screws 8, or similar fastening members, which extend into the wood through the laterally extending side flanges 9 of the casing, which latter are preferably countersunk in the lower face of the bottom rail. The casing 5 is constructed to provide a longitudinal, vertically disposed guide way 10 in the lower portion of which the weather strip 11 is vertically movable. This weather strip is provided in its lower edge with a longitudinal groove 12 in which an elastic strip, preferably of rubber, is positioned for engagement with the upper face 13 of the door sill 14, when the door is in closed position. The operating means for the same will be presently described.

The casing 5 is provided adjacent either end thereof, and on such a level that it will not interfere with the weather strip when in its inoperative position, with an apertured guide plate 15. This guide plate is preferably formed by making an inverted U-shape incision in the side wall of the casing at this point and by forcing the ear relieved by this incision inwardly at right angles to the wall. Each guide plate, as constituted by one of these inbent ears, has a vertically disposed bolt member 16 mounted therein for vertical sliding movement, the lower end of the bolt being threaded into, or otherwise attached to the corresponding end portion of the weather strip. A head 17 is provided upon the upper end of each bolt member 16, and a helical spring 18 is mounted upon the latter in interposed relation to the head 17 and the guide plate 15. These springs 18 are adapted normally to maintain the weather strip in its elevated, inoperative position within the casing.

An actuating crank 19 has its reduced ends 20 rotatably mounted within the pivot openings 21 in the side walls of the lateral casing extensions 6, the parallel arms 22 of the crank being movable in parallel vertical planes within the said casing extensions, and the connecting, active portion 23 of the crank being movable against the upper face of the weather strip at the central portion thereof, as the said active crank portion bridges the guide way 10 provided by the main portion of the casing. In order to prevent wear upon the upper edge of the weather strip, a bearing plate 24 may be attached thereto for engagement by the active portion of the crank. The said active portion 23 is provided with a laterally extending, engaging lip 25, which is movable entirely within the guide way 10. This lip is inclined upwardly at an angle to the upper edge of the weather strip when the latter is in its inoperative position. An upwardly inclined lateral arm 26 is formed on the crank 19 adjacent one end thereof in angularly spaced relation to the arms 22 of the crank, and is provided with an inbent extension 27 to which the inner end 28 of an operating rod 29 is pivotally attached. This rod 29 extends longitudinally through the guide way 10 above the weather strip 11 to one end of the casing. It is provided with a contact button or head 30 which protrudes through an opening 31 in the end wall of the casing. This button 30 is adapted to be forced inwardly upon engagement with the inclined face 32 of a contact plate 33 secured to the inner face of one of the door jambs, when the door is brought into closed position, thus causing downward motion of the active portion of the crank. This operation will cause the active under face 34 of the lip 25 to move into even engagement with the bearing plate 24, thus causing the weather strip to be held in absolutely horizontal position after the lip 25 has been completely depressed. The springs 18 resist the action of the weather strip operating means, and serve automatically to return the weather strip to inoperative position when the door is opened.

What is claimed is:

A door having a weather strip arranged in a slot in the bottom edge thereof for vertical sliding movement, yieldable means for normally retaining said strip elevated, an actuating crank bridging said slot and strip and having its cross piece bearing against the upper edge of the latter at the transverse center thereof, depending parallel arms of the crank terminating in laterally offset portions journaled in the opposite side walls of said slot, an upwardly inclined arm rising from one of said offset portions and terminally inbent in spaced parallelism with and above said cross piece of the crank, an operating rod movable longitudinally in said slot and connected with said inbent portion of said arm to operate the crank when the door is closed, and a normally inclined lip rising from said cross piece of the crank for engagement with said strip when in operative position.

In testimony whereof I affix my signature in presence of two witnesses.

CHAS. C. FISHER.

Witnesses:
J. Edward Fisher,
Nellie F. Wray.

Copies of this patent may be obtained for five cents each, by addressing the "Commissioner of Patents, Washington, D. C."